Patented Apr. 7, 1925.

1,532,663

UNITED STATES PATENT OFFICE.

PORTER W. SHIMER, OF EASTON, PENNSYLVANIA.

TREATMENT OF MOLTEN BATHS.

No Drawing.   Application filed May 15, 1923. Serial No. 639,218.

*To all whom it may concern:*

Be it known that I, PORTER W. SHIMER, a citizen of the United States, residing at Easton, in the county of Northampton, State of Pennsylvania, have invented certain new and useful Improvements in the Treatment of Molten Baths; and I do hereby declare the following to be a full, clear, and exact description of the invention, such as will enable others skilled in the art to which it appertains to make and use the same.

This invention relates to molten baths for case-hardening steel and has among its objects the renewal of the case-hardening activity of such baths after they have been used, or abused for some time.

In my United States Patents No. 1,279,457 and No. 1,279,458, I have described molten baths containing such mixtures as calcium chloride and sodium chloride; potassium chloride and sodium chloride; and other similar compounds and mixtures which after being subjected to the action of calcium cyanamide immersed therein, acquire case-hardening properties.

I find that after a case-hardening bath of the character described has been in use for a considerable period of time, especially under crude operating conditions, or when melted down in certain kinds of pots, the bath gradually loses its power of acquiring full case-hardening properties through the action of calcium cyanamide thereon as referred to above. This loss in the power to acquire case-hardening properties (frequently hereinafter referred to as loss of case-hardening activity or simply as loss of activity) is sometimes augmented by long continued use of the bath on a large production scale, particularly when the articles being case-hardened are coated with scale or when certain kinds of pots are used to contain the melt. Also I have found that trouble from this source is frequently accentuated when baths containing calcium chloride have not been thoroughly dried or when they have taken up water by long standing under exposure to atmospheric moisture or moisture from other sources. Furthermore, I have found that this loss in case-hardening activity seems to increase with the amount of lime, iron and other impurities, including silica, that are taken up by the bath from extraneous sources and partially from the calcium cyanamide lumps which are suspended in the bath for the purpose of imparting case-hardening activity thereto in accordance with the methods described in my prior patents referred to above.

When used baths or deteriorated baths which have lost more or less of their case-hardening activity, are subjected to further action of calcium cyanamide to impart case-hardening properties in the usual manner, I find that the lumps of calcium cyanamide or coked calcium cyanamide often become coated to a greater or less degree with a layer of material which ordinarily has a copper colored appearance and I believe that this coating over the calcium cyanamide has the effect of impeding the taking up from the calcium cyanamide by the bath of those constituents of the calcium cyanamide which impart the original case-hardening activity to the bath. A film of this material also adheres to or deposits on the steel parts immersed in the bath, causing I believe an impediment to case-hardening. The film will also form on other infusible solids immersed in the bath.

In accordance with the present invention when such deteriorated baths with low case-hardening activity are subjected to a treatment which results in some instances in the separation from the molten bath of a basic dross relatively high in calcium and iron content, I find that the bath again acquires its full original activity. Also I find that when a bath treated in this manner is again subjected to the action of fresh calcium cyanamide, the separation of the copper colored insoluble compound upon the surface of the calcium cyanamide no longer takes place to any objectionable extent. Furthermore the reactivated bath from which the basic dross has been separated, has the power to dissolve the copper colored coating from the surface of calcium cyanamide which has previously been immersed in a deteriorated or inactive bath.

The basic dross which results from the treatment of the bath in accordance with my invention, ordinarily contains a higher percentage of calcium and iron than the bath after treatment; and I find also that after the separation of the dross the calcium content of the bath is considerably lower than it was before the separation of the dross. I also find that the basic dross contains a higher percentage of iron than the bath from which the dross has been caused to separate, and in general the treated bath is in a higher state of purity and more nearly approaches in composition a freshly prepared and unused bath of the character described in my two patents referred to above.

The changes which occur in a freshly made bath with continued use and which result in a deteriorated bath of low case-hardening activity consist in part, I believe, in the formation of basic compounds in the bath, particularly basic chlorides such as calcium oxychloride and I conceive that the effect of moisture mentioned above in forming these impurities is that it brings about a limited hydrolysis of certain of the chlorides such as calcium chloride to produce basic chlorides such as calcium oxychloride and a certain amount of hydrochloric acid which is driven off, or the reaction may sometimes go further, I believe, to produce calcium oxide dissolved in the molten bath. Also I conceive that the deleterious effects upon the case-hardening activity of the bath produced by long continued immersion of the calcium cyanamide are due in part at least to a dissolution of basic calcium compounds or like basic compounds from the calcium cyanamide by the action of the bath.

As a reagent for bringing about a separation of the basic dross I use preferably a substance capable of mixing, fusing, melting, or dissolving in the molten bath and which, after it has thus become incorporated in the bath reacts with or otherwise affects the constituents thereof in such way as to form a dross insoluble in the molten bath. Also I prefer to carry out this reaction in such manner or produce it with a reagent of such character, that the resulting dross is not only insoluble in the molten bath but is also granular or lumpy or spongy in character so that it may be readily removed from the molten bath by means of a suitably perforated ladle.

In the practice of my invention in its preferred form, I employ, as a reagent for bringing about the separation of the dross, ordinary sodium cyanide and I prefer to add the sodium cyanide to the bath while it is in the molten condition, although I may add it in powdered form to the original bath mixture and also I prefer to use ordinarily only about one pound or less of the cyanide to a pot containing say about 100 pounds of the molten mixture such as calcium chloride and sodium chloride. The addition of the sodium cyanide soon causes a noticeable activity or commotion in the bath, followed by the separation of dross, most of which floats on top of the bath. When the bath has been kept at the proper temperature for about half an hour or even less the separation will ordinarily be complete and the dross must then be thoroughly removed from the pot, preferably by means of a suitable perforated ladle.

After this purification, which commonly need not be repeated for several weeks, the basket containing the calcium cyanamide is again immersed in the melt in accordance with the procedure described in my two U. S. patents referred to above and the case-hardening properties will then be found to have been fully restored.

While I do not wish to restrict the scope of my invention by any unwarranted assumptions as to the exact chemical reactions brought about by the cyanide or equivalent reducing agent, nevertheless I am of the opinion that the alkali cyanide first reacts with oxygen or oxide in the bath at the somewhat elevated temperature thereof resulting in the elimination of the impurities. As a result of the higher melting point of the compounds thus formed and also because of their insolubility in the molten bath, they separate from the bath in the form of a dross.

It will be understood that my invention is not restricted to the employment of sodium cyanide as the reagent in the example described above but I may use any equivalent reducing agent fulfilling the requirements already referred to, namely, that the reagent must be capable of reacting either directly or indirectly with the excess of lime or calcium oxide or other objectionable constituents in the bath to form compounds or products which are insoluble in the molten bath. Thus in place of sodium cyanide I may use potassium cyanide, metallic cyanides, such as zinc cyanide, ferrocyanides, or like powerful deoxidizing or reducing salts.

Other equivalent reagents will be obvious to those skilled in the art concerned.

It will be understood that the present invention is not restricted to the purification of case-hardening baths such as are described in my U. S. patents referred to above, but that the methods herein described and claimed may be used for the purification of non-case-hardening heating baths and molten baths of similar character.

For such purposes it is frequently advisable to add daily to the bath alkali cyanide in amounts corresponding to about 3.5 oz. per hundred pounds of molten salt. This treatment, will ordinarily make it unnecessary to use the larger amounts of cyanide at less frequent intervals as hereinbefore specified, and will not impart case-hardened properties to a non-case-hardening or heating bath.

When the smaller amounts of alkali cyanide are added daily to a molten bath it is advisable also to skim the bath shortly thereafter or as soon as the dross produced rises to the surface. In this manner a molten bath may be maintained practically continuously in a pure liquid form.

While the preferred procedure just described results in the elimination of the impurities from the bath mainly in the form of skimmings or dross which forms over the surface of the bath, nevertheless, a certain amount of impurity forms as the sediment settles to the bottom of the bath and this should be removed with a ladle preferably at the same time the bath is skimmed in order to prevent accumulation of an objectionable amount of sediment which would cause very serious difficulty due to overheating of the bottom of the pot due to the heat insulating properties of the sediment resulting in a more or less rapid disintegration of the bottom of the pot thus shortening its effective life under these operating conditions. One of the principal advantages of the daily treatment of the bath described above is the elimination or alleviation of this trouble.

I claim:

1. The method of purifying a molten bath of the character described which comprises subjecting the molten bath to the action of an alkali cyanide.

2. The method of treating a molten bath of the character described which comprises subjecting the molten bath to the action of an amount of alkali cyanide which is sufficient to react with the objectionable impurities in the bath to form an insoluble dross and then separating the insoluble dross from the bath.

3. The method of treating a molten bath of the character described which comprises subjecting the molten bath to the action of an alkali cyanide in sufficient amount and for a sufficient length of time to bring about the elimination of impurities from the bath in the form of an insoluble dross and then separating the insoluble dross from the molten bath.

4. The method of treating a molten bath of the character described which comprises subjecting the bath at suitable intervals during use to the action of about a fraction of one per cent by weight of an alkali cyanide to bring about the formation of an insoluble dross and removing the insoluble dross from the bath.

5. The method of treating a molten bath of the character described which comprises subjecting the bath at suitable intervals during use to the action of about a fraction of one per cent by weight of sodium cyanide to bring about the formation of an insoluble dross and removing the insoluble dross from the bath.

6. The method of purifying a molten case hardening bath containing calcium chloride and sodium chloride which comprises treating the bath with an alkali metal cyanide.

7. The method of treating a molten bath of the character described which comprises subjecting the bath at suitable intervals during use to the action of about a fraction of one per cent by weight of a fusible cyanide capable of dissolving in the molten bath to bring about the formation of an insoluble dross and removing the insoluble dross from the bath.

8. The method of treating an impure molten bath of the character described which comprises subjecting the bath to the action of a strongly reducing salt capable of dissolving in the molten bath to bring about the formation of an insoluble dross.

9. The method of treating an impure molten bath of the character described which comprises subjecting the bath at suitable intervals during use to the action of a strongly reducing salt capable of dissolving in the molten bath to bring about the formation of an insoluble dross.

10. The method of treating an impure molten bath of the character described which comprises subjecting the bath at suitable intervals during use to the action of a relatively small amount of a strongly reducing salt capable of dissolving in the molten bath to bring about the formation of an insoluble dross through interaction with objectionable impurities in the bath.

11. The method of treating an impure molten bath of the character described which comprises subjecting the bath at suitable intervals during use to the action of an alkali cyanide to bring about the formation of an insoluble dross with objectionable impurities in the bath.

12. The method of treating an impure nonhardening molten bath for use in the heat treatment of metals which comprises subjecting the bath to the action of a strongly reducing salt capable of dissolving in the molten bath to bring about the formation of an insoluble dross through interaction with objectionable impurities in the bath, the said strongly reducing salt being added in amounts insufficient to impart case-hardening properties to the molten bath.

13. The method of treating an impure non-case-hardening molten bath of the character described which comprises subjecting the bath at suitable intervals during use to the action of an alkali cyanide to bring about the formation of an insoluble dross through interaction with objectionable impurities in the bath, the said alkali cyanide being added in an amount which is insufficient to impart case-hardening properties to the molten bath.

14. The method of treating an impure non-case-hardening molten bath of the character described which comprises subjecting the bath at suitable intervals during use to the action of about a fraction of one per cent by weight of an alkali cyanide to bring about the formation of an insoluble dross through interaction with objectionable impurities in the bath, the said alkali cyanide being added in an amount which is insufficient to impart case-hardening properties to the molten bath.

15. The method of treating an impure non-case-hardening molten bath of the character described which comprises subjecting the bath at suitable intervals during use to the action of about a fraction of one per cent by weight of a sodium cyanide to bring about the formation of an insoluble dross through interaction with objectionable impurities in the bath, the said alkali cyanide being added in an amount which is insufficient to impart case-hardening properties to the molten bath.

16. The method of treating an impure non-case-hardening molten bath of the character described which comprises subjecting the bath at suitable intervals during use to the action of about one quarter of one per cent by weight of sodium cyanide to bring about the formation of an insoluble dross through interaction with objectionable impurities in the bath, the said alkali cyanide being added in an amount which is insufficient to impart case-hardening properties to the molten bath.

17. The method of treating an impure non-case-hardening molten bath of the character described which comprises subjecting the bath daily during use to the action of about one quarter of one per cent by weight of sodium cyanide to bring about the formation of an insoluble dross through interaction with objectionable impurities in the bath, the said alkali cyanide being added in an amount which is insufficient to impart case-hardening properties to the molten bath.

18. The method of treating a molten bath of the character described containing sodium chloride and calcium chloride which comprises subjecting the molten bath to the action of an alkali cyanide in sufficient amount and for a sufficient length of time to bring about the elimination of impurities from the bath in the form of an insoluble dross and then separating the insoluble dross from the molten bath.

19. The method of treating a molten bath of the character described containing sodium chloride and calcium chloride which comprises subjecting the bath at suitable intervals during use to the action of about a fraction of one per cent by weight of an alkali cyanide to bring about the formation of an insoluble dross and removing the insoluble dross from the bath.

20. The method of treating a molten bath of the character described containing sodium chloride and calcium chloride which comprises subjecting the bath at suitable intervals during use to the action of about a fraction of one per cent by weight of sodium cyanide to bring about the formation of an insoluble dross and removing the insoluble dross from the bath.

21. The method of manipulating a molten bath of the character described containing sodium chloride and calcium chloride which comprises subjecting the bath at suitable intervals during use to the action of about a fraction of one per cent by weight of a fusible cyanide capable of dissolving in the molten bath to bring about the formation of an insoluble dross and removing the insoluble dross from the bath.

22. The method of treating an impure non-case-hardening molten bath of the character described containing sodium chloride and calcium chloride which comprises subjecting the bath at suitable intervals during use to the action of about a fraction of one per cent by weight of an alkali cyanide to bring about the formation of an insoluble dross through interaction with objectionable impurities in the bath, the said alkali cyanide being added in an amount which is insufficient to impart case-hardening properties to the molten bath.

23. The method of treating an impure non-case-hardening molten bath of the character described containing sodium chloride and calcium chloride which comprises subjecting the bath daily during use to the action of about one quarter of one per cent by weight of sodium cyanide to bring about the formation of an insoluble dross through interaction with objectionable impurities in the bath, the said alkali cyanide being added in an amount which is insufficient to impart case-hardening properties to the molten bath.

In testimony whereof I affix my signature.

PORTER W. SHIMER.